(12) United States Patent
Lerner et al.

(10) Patent No.: US 7,783,303 B1
(45) Date of Patent: Aug. 24, 2010

(54) SYSTEMS AND METHODS FOR LOCATING DEVICE ACTIVITY IN A WIRELESS NETWORK

(75) Inventors: Yishai Lerner, San Francisco, CA (US); Steve Roskowski, Los Gatos, CA (US)

(73) Assignee: Carrier IQ, Inc., Mountain View, CA (US)

( * ) Notice: Subject to any disclaimer, the term of this patent is extended or adjusted under 35 U.S.C. 154(b) by 663 days.

(21) Appl. No.: 11/777,942

(22) Filed: Jul. 13, 2007

Related U.S. Application Data

(60) Provisional application No. 60/807,435, filed on Jul. 14, 2006.

(51) Int. Cl.
H04W 24/00 (2009.01)
(52) U.S. Cl. .................... 455/456.1; 455/422.1
(58) Field of Classification Search .............. None
See application file for complete search history.

(56) References Cited

U.S. PATENT DOCUMENTS

| | | | |
|---|---|---|---|
| 5,889,474 A | 3/1999 | LaDue | |
| 6,052,598 A * | 4/2000 | Rudrapatna et al. | 455/456.1 |
| 6,097,336 A | 8/2000 | Stilp | |
| 6,167,358 A | 12/2000 | Othmer et al. | |
| 6,205,326 B1 | 3/2001 | Tell et al. | |
| 6,263,208 B1 * | 7/2001 | Chang et al. | 455/456.3 |
| 6,266,788 B1 | 7/2001 | Othmer et al. | |
| 6,516,198 B1 | 2/2003 | Tendler | |
| 6,529,136 B2 | 3/2003 | Cao et al. | |
| 6,745,011 B1 | 6/2004 | Hendrickson et al. | |
| 6,754,470 B2 | 6/2004 | Hendrickson et al. | |
| 6,889,053 B1 * | 5/2005 | Chang et al. | 455/456.3 |
| 7,006,988 B2 * | 2/2006 | Lin et al. | 705/26 |
| 2002/0072359 A1 | 6/2002 | Moles et al. | |
| 2003/0054813 A1 * | 3/2003 | Riley et al. | 455/424 |
| 2003/0159088 A1 | 8/2003 | Phillips et al. | |
| 2005/0020278 A1 * | 1/2005 | Krumm et al. | 455/456.1 |
| 2005/0246334 A1 * | 11/2005 | Tao et al. | 707/5 |
| 2006/0007870 A1 | 1/2006 | Roskowski et al. | |
| 2006/0007901 A1 | 1/2006 | Roskowski et al. | |
| 2006/0023642 A1 | 2/2006 | Roskowski et al. | |
| 2007/0270160 A1 * | 11/2007 | Hampel et al. | 455/456.1 |
| 2008/0191844 A1 * | 8/2008 | Allen et al. | 340/10.2 |
| 2009/0300763 A1 * | 12/2009 | Harvey et al. | 726/23 |

\* cited by examiner

Primary Examiner—Ajit Patel
(74) Attorney, Agent, or Firm—Workman Nydegger

(57) ABSTRACT

Systems and methods for locating wireless devices in a wireless network. A diagnostic client on a wireless device generates timing data based on clock data received from sectors of towers communicating with the device. The timing data can be used to generate probability bands that approximate the location of the device in the wireless network. The broadcast regions of the sectors and/or the probability bands can also be used to generate the probable location of a wireless device in a wireless network. The diagnostic data can then be binned in a grid based on the approximate location of the wireless device. The statistical contributions of multiple devices to the grid can be used to characterize the performance of the wireless network.

33 Claims, 4 Drawing Sheets

SYSTEMS AND METHODS FOR LOCATING DEVICE ACTIVITY IN A WIRELESS NETWORK

CROSS-REFERENCE TO RELATED APPLICATIONS

This application claims the benefit of U.S. Application Ser. No. 60/807,435, filed Jul. 14, 2006 and entitled SYSTEMS AND METHODS FOR LOCATING DEVICE ACTIVITY IN A WIRELESS NETWORK, which application is incorporated by reference in its entirety.

BACKGROUND OF THE INVENTION

1. The Field of the Invention

Embodiments of the invention relates to wireless communications networks and related systems and devices. More particularly, embodiments of the invention relate to systems and methods for identifying locations of device activity in a wireless network.

2. The Relevant Technology

As a result of advances in technology and enormous increases in the number of wireless device users, the size and complexity of wireless communications networks have greatly increased. An inevitable consequence of such increases in size and complexity has been a relative increase in operational and performance problems associated with communications networks. Dropped calls, lack of coverage, and poor audio quality are examples of issues that frustrate end users. These and other quality issues can increase the cost of customer service and of maintaining the network and may also contribute to customer loss.

As new services are introduced that use even more complex technology, exercise different usage modalities, or place additional demands on networks, network performance will continue to be a factor that impacts usage of the technology. Quality of service also has a direct impact on customer churn, a costly problem that reduces profitability. Therefore, improving quality of service is often a top priority for service providers.

One of the difficulties associated with resolving reliability issues and improving quality of service is related to the locations of the wireless devices operating in the network. If the location of a wireless device is unknown, however, it becomes very difficult to identify and resolve reliability issues.

Conventional methods for resolving reliability issues and for improving quality of service do not adequately monitor and report a particular end user's experience with network usage. Typically, service providers often rely on the end user to report performance problems to a customer service representative. Once the problem is reported, however, the end user's problem often cannot be duplicated due to the difficulty of recounting the details of what the end user experienced, the timing of the occurrence, the lack of underlying data to validate the end user's problem, and the location of the end user's device when the problem was experienced.

In addition, the lack of location data for issues reported by end users prevents the service provider from obtaining a holistic view of the network. Without this type of view, service providers are often unable to appreciate the scope of the problem and are often frustrated in their attempts to prioritize the resolution of network issues. Systems and methods are needed that enable the location of a device to be ascertained in a manner that permits issues in the network and/or other device operating in the network to be diagnosed and resolved.

BRIEF SUMMARY OF THE INVENTION

These and other limitations are overcome by embodiments of the present invention, which relate to systems and methods for generating location based diagnostics and more particularly to determining a location of a device in a wireless network. Embodiments of the invention generate diagnostic data that represents or includes an approximation of the location of a device in the network. The location information included in the diagnostic data may be used to generate statistical information about the geographic area within the network where the device was operating when the location data was generated.

For example, this type of information can be used to characterize the performance of the network in specific geographic areas as well as improve the accuracy of dependent measurements. Advantageously, location data can be generated at any time regardless of whether a problem has occurred. By way of example, location can be generated and collected for multiple reasons in addition to when a user experiences an issue such as a dropped call. Further, as location data may be collected from multiple devices, a holistic view of the network can be generated and the performance of the network as a whole can be characterized.

In a wireless network, wireless devices communicate using towers that are located in the wireless network. Towers typically have more than one sector and a wireless device typically communicates with a particular sector, but can be aware of multiple sectors on various towers. A diagnostic client operating on a wireless device can collect diagnostic data that is used to determine the location of the device. For example, the diagnostic data may include timing information from the sectors in communication with the wireless device. Often the timing information includes an absolute clock value from the sector the device is locked onto and a timing offset representing timing from other sectors the device can decode.

The timing information including the timing offset can be used to generate hyperbolas or paths that indicate where a wireless device is expected to be located. The path is expanded in width to become a probability band that approximates the expected location of the device. The width of the probability band can account for potential errors that may include, but are not limited to, multi-path reflections, incorrect clock values, and inaccurate tower locations. When more than one probability band is generated, the location of the device can be identified as the area where the probability bands overlap. If the probability bands overlap more than once, some of the overlapping areas can be clearly discarded.

In another embodiment, the broadcast regions of the various sectors can also be analyzed to determine an approximate location of a wireless device. Using the location of a tower or sector, the azimuth of a sector, the down tilt of an antenna in a sector, the antenna type, the distance to nearby sectors or towers, and/or the expected power output, a broadcast region can be determined for a sector or an antenna of a tower with associated expected signal strength/quality. When a device communicates with one or more sectors, it is typically communicating with a particular sector of the associated towers. The approximate location can be identified by determining where the broadcast regions overlap. The overlap of the broadcast regions can also be referred to as a probability band. Further, the overlap region can be further refined using at least one probability band that is generated using hyperbolas as described above, for example.

In some instances, only a single sector can be heard by a device or a device may be listening to two sectors on the same tower. In this case, the approximate location can still be estimated as being close to the tower or based on the overlap of the broadcast regions for the adjacent sectors. The overlap of the broadcast regions, as previously indicated, is another example of a probability band.

In another embodiment, the device itself can store the information that may be used to determine or approximate the device's location. For example, the device can store the timing information from the various sectors, the identity of the sectors communicating with the device, global positioning data (GPS data), and the like or any combination thereof. This stored information can also be associated with events that occur at the device. For example, a dropped call can be associated with information that enables the location of the device to be identified or approximated when the call was dropped.

At a later time, the stored information can be uploaded for analysis. Advantageously, this enables the location data to be considered when evaluating the network at a later time. The ability to consider location data sometime after an event occurs provides several advantages. For a given device, the approximate location of a given event may be known, for example. In another example, the location data from multiple devices can be analyzed to detect patterns or to more accurately identify network issues. Further, the location data can be used to provide a holistic view of the network that is based on locations where actual device usage occurred. As indicated previously, the location data can be reported independently of problems. Thus, the holistic view includes location data from, for example, successfully completed calls, etc., as well as location data associated with issues such as dropped calls, etc. As a result, the holistic view can identify areas of a network where the network is operating successfully as well as areas where problems may be experienced.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
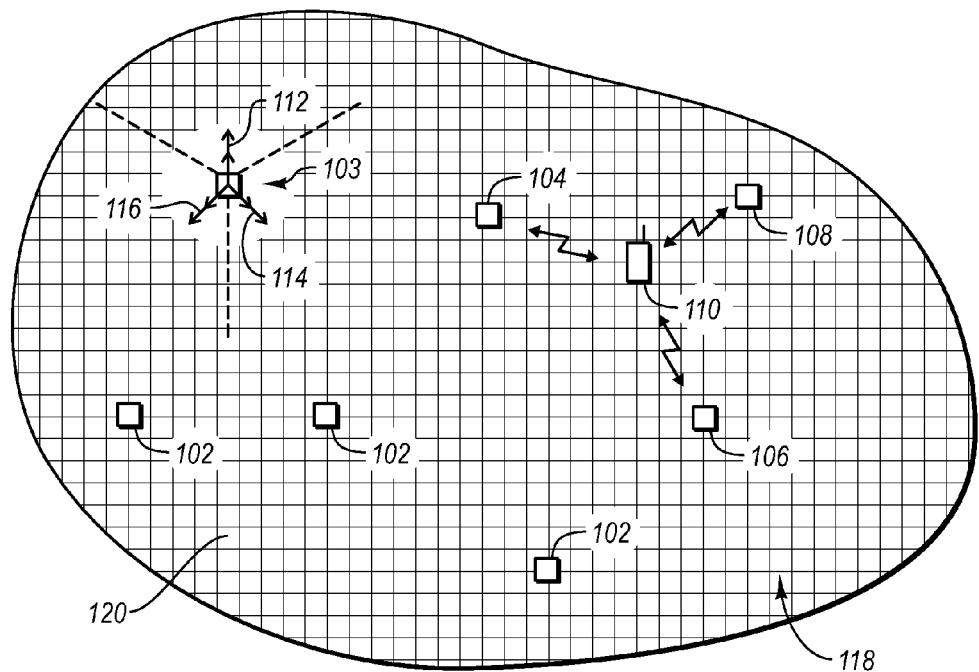
FIG. 1 illustrates one embodiment of a wireless communications network that can be represented by grid that includes grid locations or bins.

Embodiments of the invention relate to wireless communications networks and more particularly to the performance of wireless networks. Embodiments of the invention further relate to systems and methods for locating devices in wireless communications networks. The location of a device can then be used to provide or generate diagnostic data about a geographical area or relating to the performance of an RF network with respect to the location of the device. The diagnostic data collected by a wireless device, including the location data, can be transmitted in real-time or stored on the device for some period of time before being forwarded to a server for analysis. Diagnostic data, by way of example only, can be used to improve network performance, respond to user issues, identify causes of network problems, characterize the performance of the network at various levels of granularity, and the like.

In some embodiments of the invention, the location data is approximated. Advantageously, embodiments of the invention can generate diagnostic data using relatively inaccurate location data. For example, the diagnostic data from multiple devices can be collected and organized according to the location data received or collected from the devices. Thus, the location specific diagnostic data can be binned according to location or to approximate location, thereby enabling the use of statistical analysis on the binned data to improve the accuracy of dependent measurements. In one embodiment, diagnostic data can be provided or generated using poor resolution location data.

The usefulness of diagnostic data is often related to the ability to associate the diagnostic data with the locations of the devices operating in the RF networks. Embodiments of the invention use probabilistic analysis to identify a location of a device. The location data enables the performance of an RF network to be characterized at the location or at the approximate location of the device. The location data and the associated location data generated by multiple devices can, for example, enable decisions to be made regarding whether a device is working properly, identify and rectify problem areas in networks, and specifically identify the problems or issues of the networks and/or the devices operating therein. By way of example only, the network and/or devices operating therein can be characterized in terms of ratings that reflect confidence in specific grid locations, confidence in the device, and confidence in the accuracy of the device. Further, the information collected by a device and used to generate the diagnostic data can be temporarily stored on the device.

Embodiments of the invention are described in the context of cellular telephones, but one of skill in the art can appreciate that other devices including pagers, laptop computers, personal digital assistants, or other devices that utilize wireless networks will also benefit from a characterization of the respective wireless network and from having their location in a wireless network identified or approximated.

Embodiments of the invention can be applied to multiple types of wireless networks that may include, by way of example and not limitation, networks such as EVDO (Evolution Data Optimized) over 1x, WCDMA (Wideband Code Division Multiple Access) over GSM (Global System for Mobile Communications), 802.11, and the like or any combination thereof.

FIG. 1 illustrates an exemplary environment for implementing embodiments of the invention. FIG. 1 illustrates a wireless network 100. The wireless network 100 may also include an interface to other networks including computer networks such as the Internet. The diagnostic data collected from devices operating in the wireless network 100 is often transmitted to a server computer or server system for analysis. In this example, the wireless network 100 includes multiple towers 102, 103, 104, 106 and 108 that are positioned in the network 100. The towers 102, 103, 104, 106, and 108 typically have more than one sector. A tower, for example, may have three sectors that are configured to provide wireless coverage to certain areas. Wireless devices communicate with other devices in the network 100 and with devices in other networks through the sectors of the towers 102.

The tower 103 is an example of a tower that includes the antennas 112, 114, and 116, each of which is associated with a corresponding sector. The towers 102, 104, 106, and 108 may be similarly configured. For any given network, there is typically a database of tower and/or sector information that stores information describing the towers and/or sectors in the network. The database may include, by way of example, the location of the tower (e.g., latitude and longitude), the azimuth of each antenna or sector, the down tilt of each antenna in each sector, and the type of antenna.

When a device, such as the wireless device 110, uses the wireless network 100, it typically communicates with one or more of the sectors on one or more towers. The device 110 may communicate or be detected by one or more antennas of one or more towers. In this example, the device 110 may communicate with sectors of the towers 104, 106, and 108 during use. The device 110 includes a diagnostic client that collects information related to the call made by the device 110 or related to the usage of the network 100. This information may include, but is not limited to, RSSI (Received Signal Strength Indicator), which sectors of the network 100 were used for the device usage, EC/IO, noise margin, the fact that a call was made, whether the call was dropped and what type of call drop occurred.

The information provided or collected by the diagnostic client may also include timing or clock information from each or some of the sectors of the towers 104, 106, and 108. The timing or clock information can be used to identify the location of the device 110. The timing information from the device can include, by way of example, a timestamp from a sector of the tower 104 and a delta with respect to this timestamp from sectors of the towers 112, and/or 114 based on the perceived differences between the clocks of the towers 104, 112, and 114. The timestamp information can be used to locate the device 110 within the network 100.

FIG. 1 also illustrates that the network 100 may be represented by a grid 118. Each location or bin 120 in the grid 118 corresponds to a physical or geographic area. For example, each grid location or bin may correspond to 100 square meters or any other size. Once the location of the device 110 is known or at least approximately known, the information provided by the device 110 can be analyzed and associated with the grid locations or bins that correspond to the location and/or user of the device 110. Thus, the diagnostic data collected from the devices operating in the network 100 can be collected according to device location. The diagnostic data collected from the devices is analyzed and contributed to the grid. In one embodiment, the location data from device 110 determines which bins of the grid 118 receive the benefit of the data collected for or by the use of the device 110. Because a cellular telephone is mobile, it is likely that the data from another use of the device will be contributed to different bins in the grid 118. Further, the same device is likely to contribute to different bins over time as the device is used in different locations.

In this example, the diagnostic data is contributed to the grid in a location based manner. As location based diagnostic data is collected from multiple devices operating in the network 100 over time, the diagnostic data can provide a holistic, location based view of the performance of the network 100.

The following discussion illustrates examples of systems and methods for defining an area where a device is presumed to be located. Embodiments of the invention use at least a part of the diagnostic data received from the device to generate an approximate location of the device in the network based on probabilities derived from the diagnostic information received from the devices operating in the wireless networks.

Figure 2:
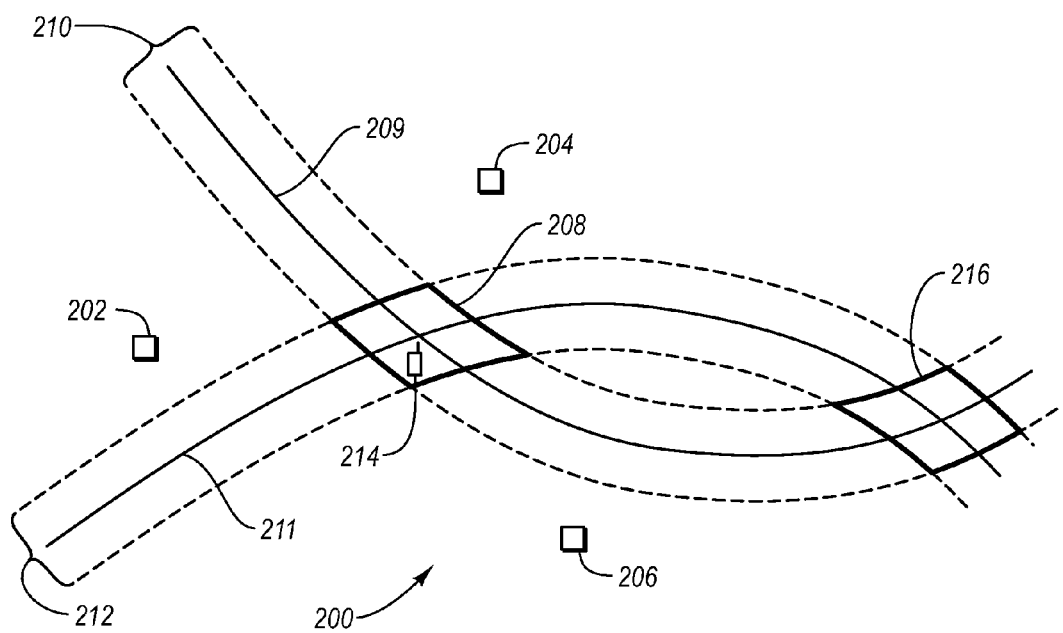
FIG. 2 illustrates one embodiment of probability bands that identify an approximate location of a device in a wireless network.

FIG. 2 illustrates one example of locating a device in a wireless network using probabilities. The portion of the network 200 illustrated in FIG. 2 includes the towers 202, 204, and 206. The towers 202, 204, and 206 generate timing data that can be received by the device 214. For example, if the device 214 locks onto a sector of the tower 204, then the timing data received from the towers 202 and 206 may be described with reference to the timing data received from the tower 204. The timing information generated by the device 214 may describe the timing data from the towers 202 and 206 in terms of offset from the tower 204.

Using the timing information from the towers 202, 204, and 206, the probability bands 210 and 212 can be generated. The probability band 210 is defined by the path 209, which can be drawn using the timing data between the towers 204 and 202, for example. The probability band 212 is defined by the path 211, which can be drawn using the timing data between the towers 204 and 206, for example. The width of the probability bands can vary, but can be set to account for certain errors that may be represented in the timing data or in the data used to interpret the timing data. Multi-path reflections in the signal from a particular tower to the device 210, inaccuracies in tower locations, an incorrect clock on the tower, and the like are examples of errors. The probability bands can account for these and other errors when determining the location of the device 214. In other words, the probability bands 210 and 212 define a general area where the device 210 is presumed to be located. The probability bands are typically based on probabilities and may not rely on a precise measurement of the device's location.

In this example, the probability band 210 overlaps with the probability band 212 to identify areas 208 and 216 in this example. The areas 216 (and other overlap areas of the probability bands, if any) can be ignored based on which sectors are in communication with the device 214. For example, it is unlikely that a device in the area 216 is communicating with the tower 202. The area 208, however, defines an approximate area or location of the device 214 in the network 200. In this manner, the appropriate overlap area of the probability bands can be selected and used as the location or approximate location of the device.

The area 208 is a probabilistic approximation of the location of the device 214 in the network 200. The area 208 may be expressed as an ellipse in order to facilitate the representation of an approximate area in a concise form. As suggested by FIG. 1, the area 208 corresponds to one or more bins of a grid that represents the network 200. The diagnostic location obtained from the device 214 can be contributed to the bins or grid locations that correspond to the area 208.

Figure 3:
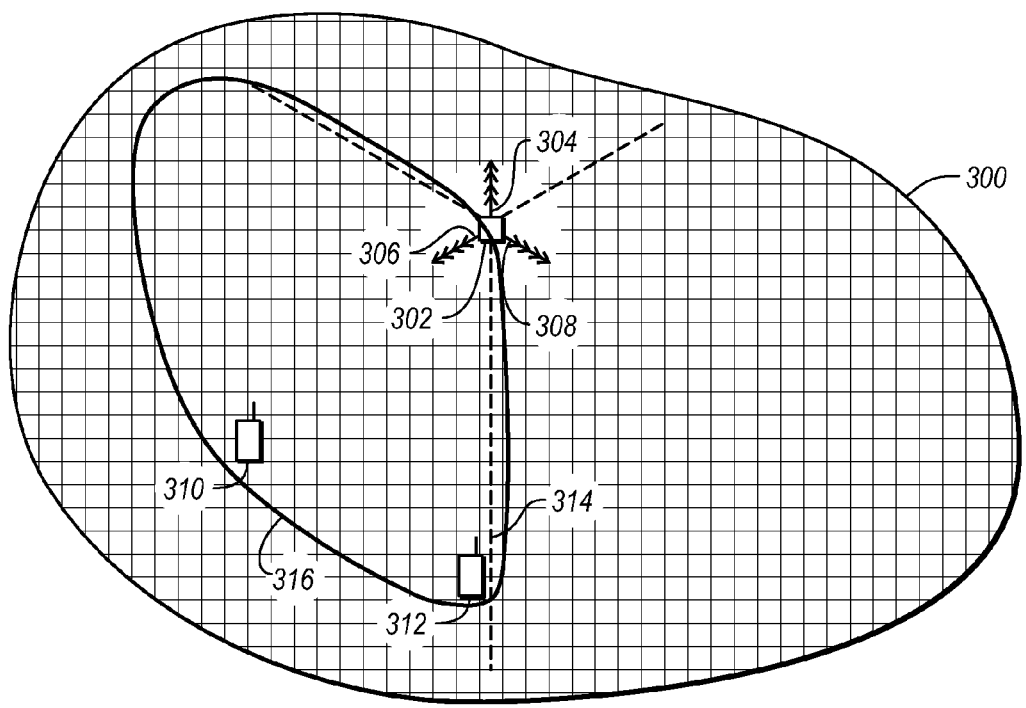
FIG. 3 illustrates the use of the broadcast regions associated with sectors of a tower to approximate a location of a device in a wireless network.

FIG. 3 illustrates a tower 302 in a wireless network 300. The tower 302 includes, as previously indicated, three sectors associated with antenna 304, 306, and 308, respectively. The location of the tower 302 is usually defined in terms of latitude and longitude. The sectors of the tower 302 may be identified using an azimuth, type, and/or a particular orientation (e.g., downtilt). Often, the information that describes the characteristics or locations of a tower or sector may be provided in a database. The database may describe the latitude, longitude, azimuth, type, orientation, and the like or any combination thereof. The database can be accessed, for example, based on a sector identifier, etc. Thus, the location of the tower can be determined by accessing the database.

When a server receives data such as timing data from a device, the server can access the database to obtain information about the towers or sectors included in the received data. The information about the towers or sectors and the data received from the device can be used to generate the approximate location of a device. The results of the location analysis can be used to resolve network issues if the diagnostic information indicates a certain problem. For example, the antenna downtilt can be altered or the antenna type changed.

Because the azimuth of an antenna in a sector is known, for example, the general broadcast region of the antenna can be determined. In this example, the broadcast region 316 corresponds to the antenna 306. A device operating in the network 300 can identify other parameters that can be used to identify its location within a broadcast region 316. The received signal strength indicator (RSSI) and the signal to noise ratio are examples of information that can be used to identify a broadcast region. A strong RSSI, for example, suggests that the device is near the tower while a weak RSSI suggests that the device is further away from the tower.

In FIG. 3, the device 310 is located within the broadcast region 316. The device 310 likely has a strong RSSI with respect to the antenna 306, but not with respect to the antennas 304 and 308. This information can be included in diagnostic data and used in identifying the probable location of the device 310. The device 312, in contrast, is near a virtual border 314 between the sector of the antenna 308 and the sector of the antenna 306. It is likely that the device 312 communicates with both the antenna 306 and the antenna 308. Because the device 312 is communicating with two antennas of the tower 302, this information can be used to identify the location of the device as being near the border 314.

FIG. 3 illustrates that the broadcast region 316 of an antenna can be used alone or in conjunction with the broadcast regions of other antennas on the same tower to approximately identify a location of a device. In other words, it is likely that the broadcast regions of the antennas in a given tower have some overlap. When a device is communicating with more than one antenna or sector of the same tower, it is more likely than not that the device is located near the virtual border 314. Once the location is approximated, the corresponding diagnostic data can be contributed or binned as described previously.

Figure 4:
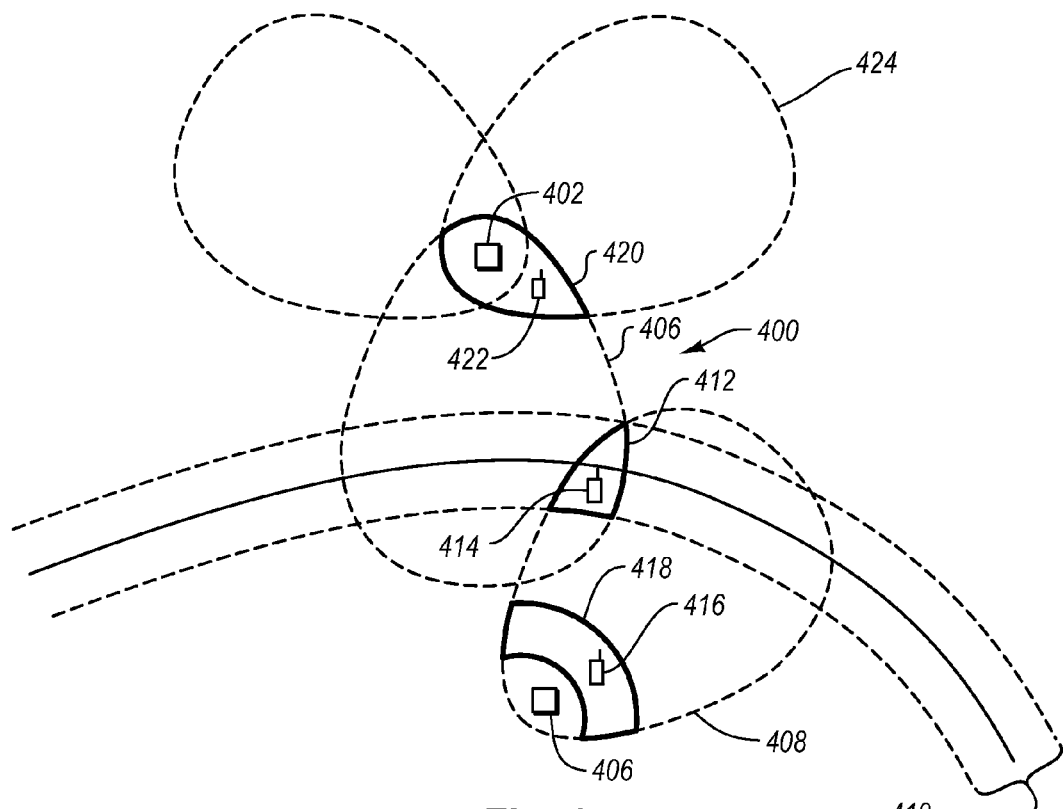
FIG. 4 illustrates another embodiment of using broadcast regions and/or probability bands to approximate the location of a device in a wireless network.

FIG. 4 illustrates another example of approximating the location of a device in a wireless network using various combinations of probability bands and broadcast regions. FIG. 4 illustrates a portion of a network 400 that includes towers 402 and 406 in communication with a device 414. The timing information collected by the device 414 can be used to generate the probability band 410. In this example, the probability band 410 does not intersect with another probability band to determine an approximate location of the device 414. In this example, the probability band 410 by itself defines a rather large area.

In FIG. 4, one sector of the tower 402 has a broadcast region 406 that can be determined based on the tower's location, which sector the device 414 is communication with, and the azimuth of that sector. Similarly, the broadcast region 408 of a particular sector in the tower 404 can also be determined. The intersection of the broadcast regions 406 and 408 can be used to approximate the location of the device 414. The probability band 410 can also be included to further identify the location of the device 414. In this example, the area 412 is defined by the intersection of the broadcast regions 406, 408 and the probability band 410. In other words, because the device 414 is communicating with or aware of sectors from both towers 402 and 404, it is likely that the device is located in the overlap of the corresponding broadcast regions. This area can be further refined by using the intersection of the probability band 410 and the broadcast regions 406 and 408.

FIG. 4 also illustrates the device 416. In this case, the device 416 is located close to the tower 406. As a result, the device 416 may not be able to communicate with other towers or sectors because the signal from sectors on tower 406 drown out other more distant sectors. As a result, the best location estimate for the device is one very close to tower 406. This information, in combination with the determination of the broadcast region 408, can be used to determine that the device 416 is in the area 418. The area 418 can be further determined, for example, using other information provided by the diagnostic client on the device 416 such as the RSSI, signal to noise ration, and the like.

As illustrated above, there are instances where a device can be expected to be in communication with multiple sectors or towers—a high tower density. In contrast, there may be instances where the tower density is low. In this case, the same device readings—e.g., only having a single sector visible—are indicative the device can only communicate with a single sector or a single tower. In effect, there is only one sector in the region the device is currently operating in. Other towers or sectors are not visible to the device. One estimate of the device location when only a single sector or tower is visible is someplace near the center of the tower or sector broadcast region. In one embodiment, the center point or other point of the sector can be selected as the approximate location of the device. Because of the lower tower density, the estimation of the accuracy of the location may also be low. Thus, the density of towers or of sectors is another example of input used to approximate the location of a device in a network.

In yet another example, the tower 402 has the broadcast region 406 for one sector and the broadcast region 424 for another sector. A device 422 that communicates with the sectors associated with the broadcast regions 406 and 424 can be located by the area 420 that defines the overlap between the broadcast region 406 and the broadcast region 424.

Figure 5:
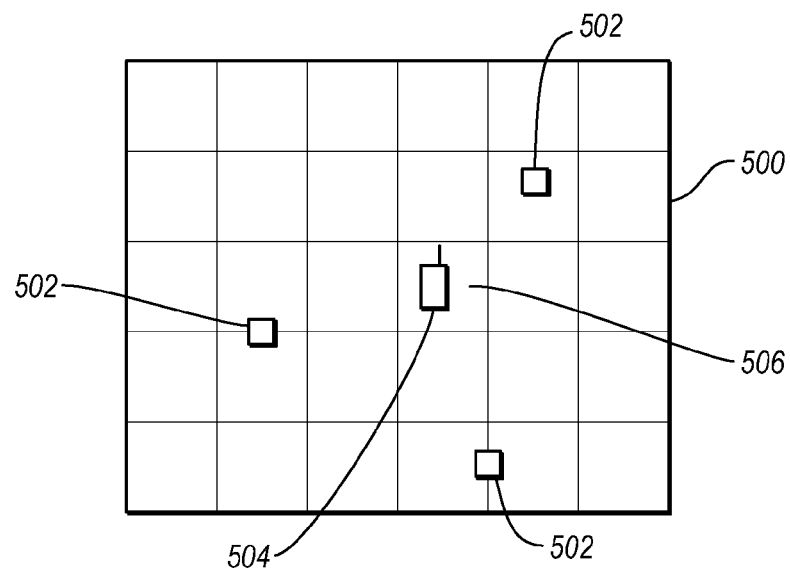
FIG. 5 illustrates a grid that corresponds to a wireless network and that location data can be pre-computed and used to identify the location of a device based on a best fit.

In another embodiment, the process of approximating the location of a device can be reversed. The location data or probabilities can be pre-computed and compared with data received from devices. For instance, a bin in the grid or a group of bins can have expected data or probabilities pre-computed with regard at least to location. A bin or group of bins, for example, may have pre-computed probability bands, broadcast regions, RSSI, signal to noise ration, etc. When diagnostic data is received from a device, a best fit analysis can be applied to the diagnostic data to identify the location of a device in a network. The location can be immediately narrowed to the areas surrounding using the towers or sectors that are in communication with the device or that the device is aware of. For example, FIG. 5 illustrates a grid that corresponds to a wireless network. In this example, the locations of the towers 502 are indicated on the grid 500. A device 504 is located within the network represented by the grid 500.

As previously stated, the probabilistic data described above can be pre-computed for each bin or at least for some of the bins in the grid 500. For example, when the device 504 is in the grid location 506, the server would expect to receive certain diagnostic data from the device 504. The expected data can be pre-computed based on tower locations, sector azimuth, antenna tilt, expected RSSI or signal to noise ration based on location of bin with respect to the towers 502, and the like or any combination thereof. The expected diagnostic data could include the timing information from the relevant towers 502, RSSI and the like. The diagnostic data actually received from the device 504 is compared with the expected diagnostic data until a best fit is achieved. When the best fit is achieved, the location of the device can then be determined or approximated based on the location of the bins that fit the diagnostic data provided by the device.

In some instances, inaccuracies in the network can be determined. For example, if the diagnostic data from multiple devices consistently fits with two out of three towers, it may be an indication that the presumed location or other aspect of the third tower is incorrect. It could also suggest that maintenance may be required for the third tower. It could also be an indication that the information describing the location or other aspect of the third tower is incorrect. This information can then be used to improve the grid performance as well as improve the performance of the wireless network.

As previously indicated, information describing towers is often stored externally in a database. If the diagnostic data indicates that the location of the tower is incorrect, it is possible that the information in the database describing the location is incorrect. Thus, it may be that the database is the source of errors. A correction to the database can then be made. The information may also indicate that an antenna has become disoriented and may require correction. For example, the database may reflect the appropriate azimuth or downtilt of a particular antenna. However, the location data suggests another azimuth or downtilt. This antenna could then be adjusted accordingly to correct any resulting errors in the approximation of the location data.

As the diagnostic data is collected from the various devices in the network, the diagnostic data can reflect clutter in the wireless network. In other words, the actual data that is binned is representative of multi-path reflections, the presence of buildings or other things that can interfere with a wireless signal, and the like. Once the data associated with the grid is binned and analyzed (which may include a statistical analysis), this information can be used for planning purposes and the like. This type of information can be used to prioritize issues in the network that may need to be resolved.

The binned diagnostic data can be used for other purposes as well. For instance, many simulations are typically performed before a wireless network is deployed. Unfortunately, these simulations often do not have an accurate representation of the clutter that may be present in a given network. The data collected and/or produced by embodiments of the invention can be used in the simulations to account for clutter. The results of the network simulations can be improved because real location based diagnostic data is used to simulate clutter. As a result, the locations of new towers or the adjustment of existing towers can be made to improve the wireless network based on these simulations.

As illustrated above, the probability bands identify an area where the device is presumed to be located. The probability band may encompass more than one bin as described in FIG. 1. In one embodiment, the diagnostic data can be contributed to more than one bin or more particularly, to each of the bins that correspond to the approximated area. In another embodiment, the contribution to the various bins can be weighted as well based on the location of the bins within the approximated area. As noted above, the device is less likely to be located at the perimeter of the approximated area. Thus, bins that are located in these areas receive less of a contribution from a particular user.

Figure 6:
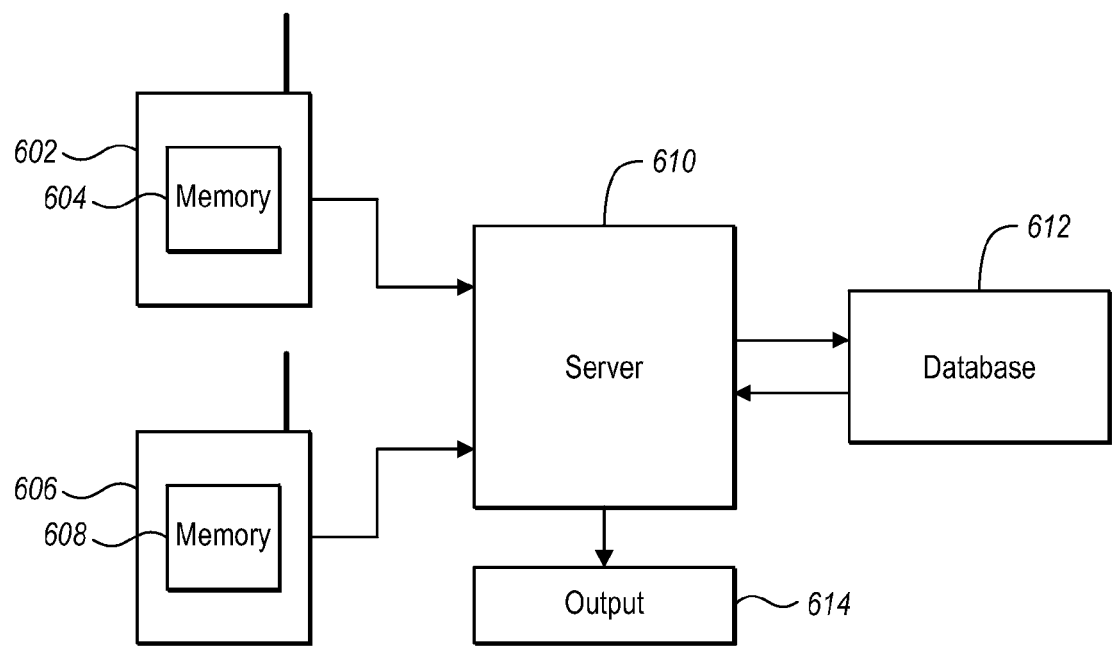
FIG. 6 illustrates one embodiment of a system for collecting diagnostic data including location data from devices operating in a network and for storing the diagnostic data according to location.

FIG. 6 illustrates another aspect of using location data in conjunction with diagnostic data. As discussed above, certain data used to generate the location of the device 602 can be collected by a device 602 and stored in the memory 604 of the device 602. This data may include clock data from multiple sectors, RSSI data, noise margin, and the like. In some embodiments, GPS data may also be collected by the device. Some of the information (tower/sector location, etc.) used to compute the location of the device can be stored remotely or transmitted to the device.

FIG. 6 illustrates a database 612 that can be used by the server to store information or from which the server 610 may access information. Thus, the database 612 is intended to represent one or more databases. Further, the databases may be independent of each other and may be maintained by different entities.

In any case, the device 602 can collect pertinent information and store the collected information in the memory 604. The collected information, or the diagnostic data, can then be transmitted to the server 610 or other system at any time. Thus, the device 602 can store and forward the diagnostic data at any time. This enables the device 602 to transmit at off-peak times or to transmit a batch of data at the same time, and the like. Similarly, the device 606, which represents other devices operating in the wireless network, can also store and forward diagnostic data to the server 610. Alternatively, the device may store the diagnostic data until it is requested by the server 610, at which point the data is forwarded to the server 610.

The server 610 can then compute the location of the device 602 and add the collected data to the database 612 according to the computed location as described herein. Over time, the database 612 can represent an overview of the performance of the network from specific locations within the network. This information has many advantages from being able to identify the cause of an event, identify problem areas of a network, model clutter of a geographic area, identify ideal locations for new towers, and the like or any combination thereof. The output 614 of the server 610 represents the content of the database 612 as applied to various problems.

If a call is lost by the device 602, then the database 612 can provide information that indicates whether the location of the device 602 has a history of dropped calls. This may suggest that the network has poor coverage in this location. One of skill in the art, with the benefit of the present disclosure, can appreciate that, the content of the database 612 can be used to evaluate the performance of the wireless network or of devices operating in the wireless network. The content of the database 612 can also be used to prioritize network improvements, the deployment of new or replacement towers, and the like.

In another example, the database 612 stores information describing factors or characteristics of towers and sectors of a wireless network. When the server 610 receives data from a device, the server 610 can use the information to access the database 612 and obtain information describing the towers or sectors that were in communication with the device. The information may include, but is not limited to, location (e.g., latitude, longitude, and/or elevation), azimuth, antenna type, sectors, number of sectors, orientation, manufacturer, and the like or any combination thereof. This information can be used in generating the output 614 as described herein.

Thus, the database 612 or other external database can provide information that is useful in identifying a location of a device or an approximate location of the device. However, accessing the database for this type of information is not always straight forward because the information needed to properly identify a particular sector or tower may be missing, truncated, corrupt, and the like. As a result, when utilizing a database (which may be an external database) for tower and sector information, it is sometimes challenging to properly associate the information received from the device with the appropriate information stored in the database.

For example, wireless protocols frequently use identification information for different sectors that is significantly truncated to minimize the amount of data transferred over the air. Further, in practice some carriers do not consistently populate data fields that are intended to uniquely identify radio sectors. As a result, it is sometimes necessary to find a closest match within the database to the information provided by the device.

One process for finding a best fit in the database is straight forward when unique sector information is available to the device. In some cases, sectors broadcast their latitude and longitude, which when combined with their frequency and other identifying information provides a unique match in the database. In other cases, the sector broadcasts a unique identification number or code, which can also be used to associate information from the database with the information received from devices operating in the network.

If only partially unique information is available to the device, a more complex method can be utilized. In practice, there is typically some level of information available about all sectors visible from the device. In CDMA networks, by way of example only, one such value is the "PN Code" which defines the pseudo random noise code utilized to encode the data transmitted by the sector. This value is locally unique (only one sector in a give region can use this value). Thus, the PN Code is another example of information that can be collected by a device and received by a server when identifying or approximating the location of a device.

More particularly, the PN Code can be the data used to help associate the information received from the device with proper records in a database to retrieve additional information about the sector(s) communicating with the device. By comparing the set of PN Codes visible to the device with the set of PN Codes local to a given tower in the database (locality determined by comparing the latitude and longitude values stored in the database with each sector information), a unique match can frequently be determined. Once the match is determined, the relevant information can be used by the server to identify or approximate the location of the device. In other embodiments, a partial match can still be used. When a partial match is accessed from the database, however, the server typically analyzes the resulting location data to make sure that it makes sense in the context of the other information collected by the device. For instance, if the retrieved location associated with a partial match is too far away from the device to be a primary sector, then the partial match is discarded.

Figure 7:
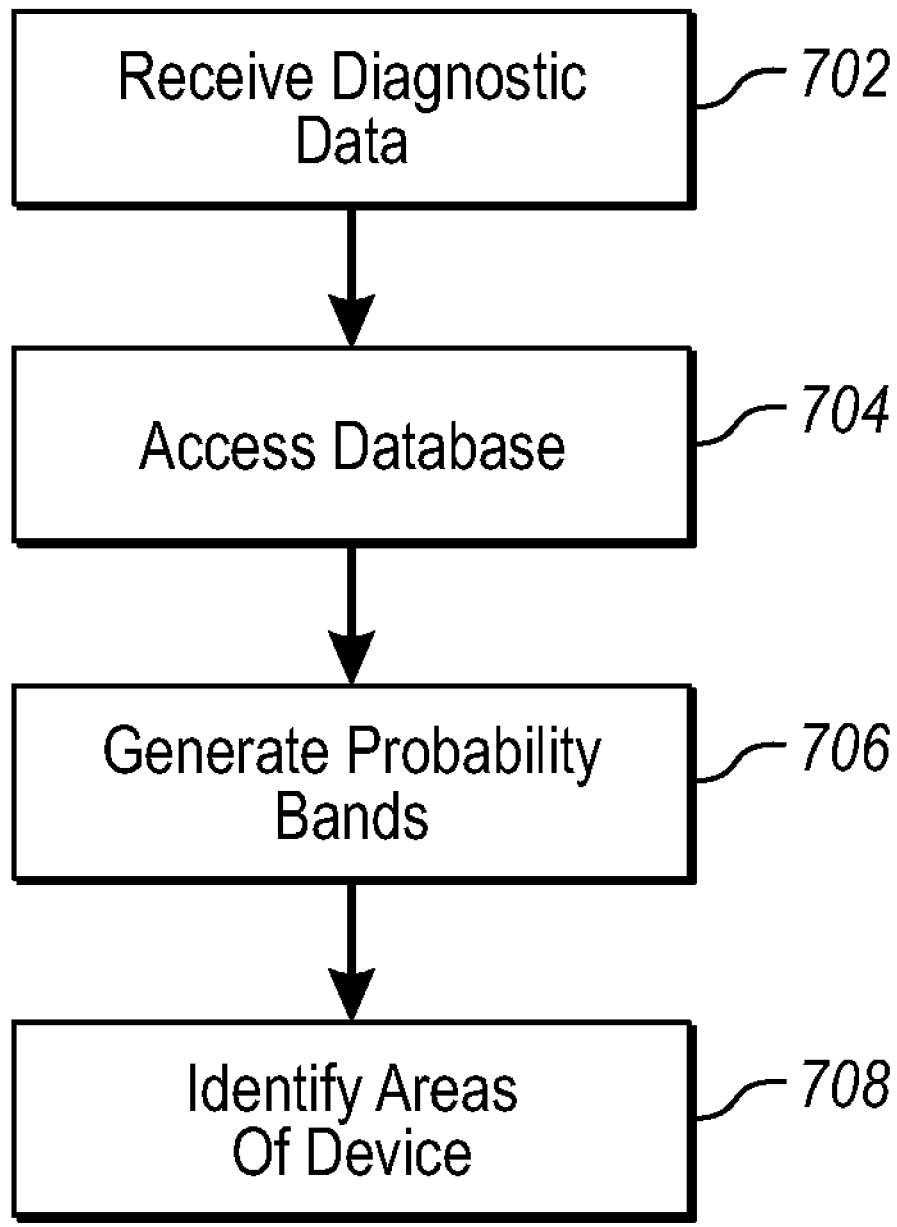
FIG. 7 illustrates one embodiment of a method for identifying or of approximating a location of a device in a network.

FIG. 7 illustrates an example of a method for identifying or for approximating the location of a device or of multiple devices in a network. Typically, a server operating in a network receives 702 diagnostic data from at least one device operating in the network. The diagnostic data received from the device includes information that describes or identifies aspects of the device and/or of the network in which the device operates. The diagnostic data can include information that is received from radio elements such as towers or sectors that communicate with the device at any given time or during a particular event. The information may include sector identifiers or partial sector identifiers, latitude, longitude, PN Codes, and the like. This information is typically provided at least for the primary sector as well as for other sectors visible to the device. The diagnostic data can also include information describing or related to the device as described herein.

After receiving the diagnostic data, the server may access a database to retrieve additional information related to the sectors or other radio elements in the network that may have communicated with the device. Typically, the server ensures that the information accessed from the database is correct and is a match for the diagnostic data received from the device. Proper identification of the sectors ensures that the approximated location of the device is accurate and useful, for example, when contributing the device's data to bins of a grid.

Thus, accessing the database includes associating the diagnostic data with correct sector information. Accessing the database may also include performing steps to insure that the match is correct. This can be done by comparing latitude and/or longitude information, PN codes, and the like.

After the information describing the sector(s) is accessed and verified in one example, the server is able to generate one or more probability bands. These probability bands may include broadcast regions. A particular area is then identified as the location or approximate location of the device. Typically, the area identified is where the probability bands overlap. If more than one overlap is present, one of them is usually discarded. Next, the diagnostic data can be processed and contributed to the bins associated with the identified area.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for locating a wireless device in a wireless network, the method comprising:
   receiving diagnostic data from a wireless device, the diagnostic data including timing data from one or more sectors;
   generating a first probability band and a second probability band using the timing data; and
   identifying an area where the first probability band overlaps with the second probability band, wherein the area corresponds to an approximate location of the wireless device in the wireless network, wherein a second area where the first probability band overlaps with the second probability band is discarded when identifying the area.

2. A method as defined in claim 1, wherein receiving diagnostic data from a wireless device further comprises identifying towers associated with the one or more sectors in communication with the wireless device.

3. The method as defined in claim 2, wherein identifying towers associated with the one or more sectors in communication with the wireless device further comprises accessing a database to obtain information describing the one or more sectors.

4. The method as defined in claim 3, wherein accessing a database to obtain information describing the one or more sectors further comprises accessing, from the database, one or more of:
   latitudes of the one or more sectors;
   longitudes of the one or more sectors;
   antenna types of the one or more sectors;
   orientation of the antennas of the one or more sectors;
   broadcast powers of the one or more sectors;
   azimuths of the one or more sectors; or
   a density of the one or more sectors.

5. The method as defined in claim 3, wherein accessing the database includes associating first information included in the diagnostic data with second information stored in the database, wherein the first information identifies one or more sectors the wireless device is using and wherein the second information provides data describing the one or more sectors.

6. The method as defined in claim 5, wherein the first information includes data from multiple sectors and wherein accessing the database further comprises using the first information to uniquely associate the first information with the second information such that the second information is proper.

7. The method as defined in claim 6, wherein the unique association is accomplished by comparing the first information in the diagnostic data received from the device with information determined to be geographically close to a sector in consideration.

8. A method as defined in claim 1, wherein generating a first probability band and a second probability band further comprises generating a plurality of probability bands for the one or more sectors.

9. A method as defined in claim 8, wherein identifying an area where the first probability band overlaps with the second probability band further comprises identifying an area where a largest number of the plurality of probability bands overlap.

10. A method as defined in claim 1, wherein generating a first probability band and a second probability band further comprises establishing a width for each of the plurality of probability bands to account for at least one of multi-path reflections, inaccuracies in locations of the one or more sectors, or inaccuracies in clocks of the one or more sectors.

11. A method as defined in claim 1, wherein the wireless network is represented by a grid having bins, further comprising binning the diagnostic data in specific bins of the grid that correspond to the area identified by where the first probability band overlaps with the second probability band.

12. A method as defined in claim 1, further comprising refining the area based on broadcast regions of the one or more sectors.

13. A method as defined in claim 1, wherein generating a first probability band and a second probability band further comprises generating a first path and a second path based on the timing data, wherein the first probability band is generated around the first path and the second probability band is generated around the second path.

14. A method as defined in claim 1, wherein receiving diagnostic data from a wireless device comprises receiving diagnostic data periodically from the wireless device, wherein the wireless device stores the diagnostic data and then forwards the diagnostic data on a periodic basis, in response to an action or status change on the device, or in response to a request from a server.

15. A method for locating a wireless device in a wireless network, the method comprising:
   receiving diagnostic data from a wireless device, the diagnostic data including timing data from a first sector and a second sector;
   determining a first broadcast region for the first sector;
   determining a second broadcast region for a second sector;
   identifying an area where the first broadcast region overlaps with the second broadcast region, wherein the area corresponds to an approximate location of the device in the wireless network and wherein the wireless network is represented by bins and each bin is associated with a particular location in the wireless network;
   accounting for a received strength indicator from the first sector and from the second sector;
   accounting for a signal to noise ratio with respect to the first sector and to the second sector;
   accounting for the timing data included in the diagnostic data; and
   binning the diagnostic data in particular bins associated with a location of the area where the first broadcast region overlaps with the second broadcast region.

16. A method as defined in claim 15, further comprising accessing a database to obtain information about the first sector and the second sector, the information including at least a location of the first sector and a location of the second sector.

17. A method as defined in claim 16, further wherein the first broadcast region and the second broadcast region are generated using the information describing the location of the first sector and the location of the second sector.

18. A method as defined in claim 15, wherein the timing data includes first timing data from the first sector and an offset from the second sector.

19. A method as defined in claim 15, wherein identifying an area where the first broadcast region overlaps with the second broadcast region further comprises:
   determining a received signal strength for the first sector and for the second sector; and
   determining a signal to noise ratio for the first sector and for the second sector.

20. A method as defined in claim 15, wherein the first sector and the second sector are located at a first tower.

21. A method as defined in claim 15, further comprising:
   determining a plurality of broadcast regions; and
   identifying a location of the area with where a largest number of the plurality of broadcast regions overlap.

22. A method as defined in claim 21, further comprising refining the area based on an overlap of a probability band determined using the timing data with the overlap determined by the first broadcast area and the second broadcast area.

23. A method as defined in claim 15, wherein determining a first broadcast region further comprises:
   accounting for a latitude and longitude of the first sector;
   accounting for an azimuth of the first sector;
   accounting for a downtilt of at least one antenna in the first sector; and
   accounting for an antenna type.

24. A method as defined in claim 15, wherein determining a second broadcast region further comprises:
   accounting for a latitude and longitude of the second sector;
   accounting for an azimuth of the second sector;
   accounting for a downtilt of at least one antenna in the second sector; and
   accounting for an antenna type.

25. A method as defined in claim 15, wherein receiving diagnostic data from a wireless device further comprises one or more of:
   receiving the diagnostic data periodically from the wireless device, wherein the diagnostic data represents more than one use of the wireless device, each use corresponding to a different location in the wireless network;
   requesting the diagnostic data from the wireless device.

26. A method as defined in claim 15, wherein the wireless network is represented by a grid having bins, further comprising binning the diagnostic data in specific bins of the grid that correspond to the area.

27. A method as defined in claim 15, wherein determining a first broadcast region further comprises factoring for different tower density.

28. A method for determining an approximate location of a device operating in a wireless network, the method comprising:
   establishing a grid that represents a wireless network, the grid having bins that are associated with locations in the wireless network;
   pre-computing location data for the bins in the grid, the location data including parameters that are expected from a wireless device, wherein pre-computing location data includes:
      accessing a database to obtain information describing at least locations of one or more sectors operating in the wireless network including;
      pre-computing one or more probability bands for the bins in the grid based in part on the locations of the one or more sectors;
      pre-computing timing data for the bins, wherein the timing data represents timing data that the wireless device is expected to receive for the locations associated with the bins, the timing data based in part on the locations of the one or more sectors; and
      identifying one or more sectors that are expected to contribute timing data for the bins;
   receiving diagnostic data from a wireless device; and
   comparing the diagnostic data with the pre-determined location data to determine at least one best bin, wherein a location of the device corresponds to one or more bins whose associated location data is the best fit for the diagnostic data received from the wireless device.

29. A method as defined in claim 28, further comprising associating one or more broadcast regions of one or more sectors with the bins in the grid.

30. A method as defined in claim 28, further comprising binning the diagnostic data in one or more of the bins that have the best fit with the pre-computed location data.

31. A method as defined in claim 30, wherein the one or more of the bins whose associated location data is the best fit for the diagnostic data are contiguous.

32. A method as defined in claim 28, wherein pre-computing location data for the bins in the grid further comprises one or more of:
   accounting for a latitude and longitude of one or more sectors in the wireless network that impacts one or more of the bins;
   accounting for an azimuth of at least one sector of one or more towers;
   accounting for a down tilt of one or more antennas; and
   accounting for an antenna type in one or more sectors of one or more towers.

33. A method as defined in claim 28, wherein pre-computing location data for the bins in the grid further comprises one or more of:
   accounting for a received strength indicator expected from one or more towers associated with one or more bins;
   accounting for a signal to noise ratio with respect to one or more towers associated with one or more bins; and
   accounting for the timing data expected for one or more bins.

* * * * *